US 6,722,742 B2

(12) United States Patent
Potes et al.

(10) Patent No.: US 6,722,742 B2
(45) Date of Patent: Apr. 20, 2004

(54) SUSPENSION ANCHORING SYSTEM FOR A SEAT

(75) Inventors: Duane E. Potes, Adrian, MI (US); Jeffrey M. Suiter, Taylor, MI (US)

(73) Assignee: Johnson Controls Technology Company, Holland, MI (US)

( * ) Notice: Subject to any disclaimer, the term of this patent is extended or adjusted under 35 U.S.C. 154(b) by 35 days.

(21) Appl. No.: 09/946,952

(22) Filed: Sep. 5, 2001

(65) Prior Publication Data

US 2003/0042783 A1 Mar. 6, 2003

(51) Int. Cl.⁷ ................................................. B60N 2/50
(52) U.S. Cl. ................................................. 297/452.56
(58) Field of Search ........................ 297/452.55, 452.56, 297/452.1, 452.63

(56) References Cited

U.S. PATENT DOCUMENTS

| | | | |
|---|---|---|---|
| 1,652,687 A | 12/1927 | Slowinski et al. | |
| 3,589,763 A | * 6/1971 | Reeves | 297/452.56 |
| 3,677,601 A | 7/1972 | Morrison et al. | 297/441 |
| 3,902,756 A | * 9/1975 | Chubb | 297/452.56 |
| 3,977,721 A | 8/1976 | Peterson | 297/45 |
| 4,431,229 A | 2/1984 | Unger | 297/441 |
| 4,592,126 A | 6/1986 | Bottemiller | 29/446 |
| 4,702,522 A | * 10/1987 | Vail et al. | 297/452.56 |
| 4,757,854 A | 7/1988 | Rippberger | 160/391 |
| 4,842,257 A | 6/1989 | Abu-Isa et al. | 267/133 |
| 4,869,554 A | 9/1989 | Abu-Isa et al. | 297/452 |
| 5,013,089 A | 5/1991 | Abu-Isa et al. | 297/452 |
| 5,328,248 A | 7/1994 | Nishiyama | 297/452 |
| 5,393,126 A | 2/1995 | Boulva | 297/452 |
| 5,439,271 A | 8/1995 | Ryan | 297/452.56 |
| 5,441,331 A | 8/1995 | Vento | 297/452.33 |
| 5,445,254 A | 8/1995 | Charles | 192/17 R |
| 5,533,789 A | 7/1996 | McLarty, III et al. | 297/452.64 |
| 5,582,463 A | 12/1996 | Linder et al. | 297/452.2 |
| 5,676,336 A | 10/1997 | Nefy et al. | 244/122 R |
| 5,768,758 A | 6/1998 | Deignan et al. | 29/91.1 |
| 5,775,779 A | 7/1998 | Abu-Isa et al. | 297/452.56 |
| 5,787,562 A | 8/1998 | Penley | 29/402.08 |
| 5,855,991 A | 1/1999 | McLarty, III | 428/195 |
| 5,957,532 A | * 9/1999 | Watkins | 297/452.63 |
| 6,059,368 A | 5/2000 | Stumpf et al. | 297/440.11 |
| 6,113,186 A | 9/2000 | Holmes et al. | 297/248 |
| 6,231,125 B1 | 5/2001 | Maeda et al. | 297/452.56 |
| 6,435,618 B1 | * 8/2002 | Kawasaki | 297/452.56 |

* cited by examiner

Primary Examiner—Peter R. Brown
(74) Attorney, Agent, or Firm—Foley & Lardner

(57) ABSTRACT

A suspension device for use in a vehicle seat includes a frame member and a support member offset from the frame member and a tension member connected to the frame member for stretching tight and contouring a suspension material. The suspension material has a first end for connection with the support member in a second end formed from a stitched loop in the material for connection with the tension member. A method of manufacturing a seat having a seat suspension device includes selecting a frame member and a support member offset from the frame member and a tension member connected to the frame member for receiving a suspension material when the tension member is dislocated from the frame member and connecting the first end of the suspension material to the support member and connecting the tension member to the frame member such that the member is installed in tension and contoured with respect to the frame member.

11 Claims, 4 Drawing Sheets

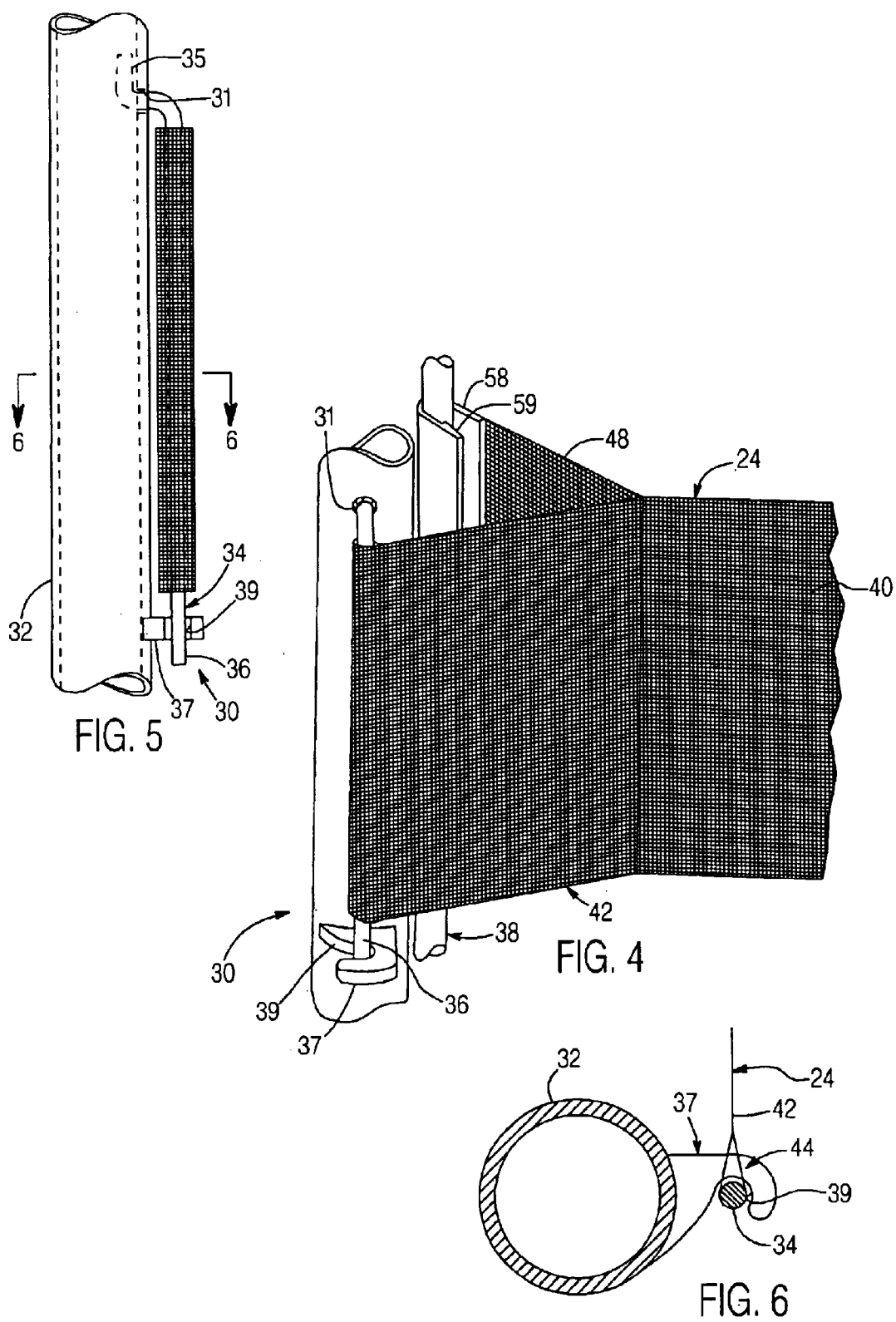

SUSPENSION ANCHORING SYSTEM FOR A SEAT

FIELD OF THE INVENTION

The present invention relates generally to seats and seat manufacturing. More particularly the present invention relates to a seat having a suspension material and anchoring system therefore and a method of manufacturing a seat having a suspension material and anchoring system for use in a vehicle.

BACKGROUND OF THE INVENTION

Elastomeric suspension materials for use in manufacturing a suspended seat cushion or seat back in a seat are known. In particular the use of a suspension material in an automotive vehicle seat is known. For example, U.S. Pat. No. 5,441,331 discloses a suspension system within a seat portion of a vehicle seat. The suspension system includes an elastomeric fabric secured to a seat frame using plastic clips or plastic edge strips. Additionally, seat cushions are provided which are carried by the suspension.

References similar to the above include U.S. Pat. Nos. 6,231,125; 5,439,271; 5,676,336; 4,842,257; 4,869,554; 5,013,089 and 5,328,248 all of which disclose a mechanical fastening element of various types to fasten a suspension material to a frame seat. Thus it is known to use a mechanical fastening means that includes an elastomeric strip to which the suspension material is fastened or sewn and the strip is captured within a pocket on or about the seat frame.

U.S. Pat. No. 5,787,562 discloses an aircraft passenger seat including a quick replacement seat bottom diaphragm or suspension. The seat bottom diaphragm includes fore and aft attachment members for quick attachment and detachment from respective fore and aft stretcher bars. The attachment members preferably are formed as channels within the woven fabric of the diaphragm and are preferably integrally formed within the diaphragm to form a channel integrally formed within the woven fabric for receiving the stretcher bar. The stretcher bars are received on the seat frame and supported thereby, and the diaphragm further includes a hook-and-loop type fastener for attachment of a seat cushion.

Consistent with the above, several attempts have been made to engineer and improve the characteristics of the elastomers used in the suspension material. For example U.S. Pat. No. 5,775,779 relates to a seat suspension membrane consisting of a bi-axially oriented film of a polyurethane thermoplastic elastomer composition.

U.S. Pat. No. 5,533,789 discloses a seating structure including a fabric support web formed of a wrap-knit fabric with weft insertion of an elastomeric yarn to provide a stretch in the wrap that is substantially linear over a full range of applied stress from 0 pounds to failure. U.S. Pat. No. 5,855,991 discloses a composite textile structure which includes a woven base fabric of elastomeric yarns running in one direction and having a bi-component sheath/core elastomeric monofilament yarns. The sheath/core elastomeric monofilament yarn is designed to have a sheath with a melting point below that of the melting point of the core elastomeric monofilament.

Suspension seats are also known in the furniture art. It is known to provide a seating surface as well as a seat back made of a suspension material connected to a frame. For example U.S. Pat. No. 5,393,126 discloses a tubular frame seating structure with a tension sleeve that is maintained on a rod-like member frame due to a compression force provided between the sleeve and the frame. The '126 reference discloses that the tension can be created by adding a tensioning bar between two frame members or may be created by an interference fit between the frame and the sleeve. It is further disclosed that loops are used for installing the tensioned sleeve material on the frame. U.S. Pat. No. 6,113,186 discloses the use of moveable stretcher bars having a fabric suspended thereon wherein the stretcher bars are tightened to stretch the fabric using a threaded member passing through the base frame and the stretcher bar. U.S. Pat. No. 6,059,368 discloses an office chair having a woven membrane in a stretched condition machine and then clamped between a lower and upper loom so it is fixed to frame members which are then placed in an additional structural frame member to form the seat portion and the back portion of the office chair.

A significant draw back of the prior art is that the designs do not provide for the provision of a contour in the material or fabric being stretched across the frame. While some soft contour is possible, it leads to highly undesirable results. The prior art designs have a significant draw back in that they are very difficult to install and manufacture and more difficult if there is a contour in the material. Accordingly, it has not been very difficult and even impossible to achieve certain seat designs for a suspended material seat. With the known designs and it is not possible to obtain such characteristics while providing for a relatively easy and inexpensive assembly of the stretched suspension material.

SUMMARY OF THE INVENTION

One embodiment of the present invention relates to a seat suspension device for suspending a material on a frame such as a frame of a seat. The seat suspension device according to the present invention provides a significant improvement in the ease of assembly when installing a material such as an elastomeric filament based woven fabric on a frame of a vehicle seat. A frame member has a predefined cross-section and forms a bar portion of the seat. The seat further includes a support member offset from the frame member, the support member also has a predefined and formed perimeter. A tension member is connected to the frame member at a first end and a second end of the tension member is removably connected to the frame member such that a connector or a loop an end of the material can be connected or slid over the tension member when the second end of the tension member is not connected to the frame member. After the material is connected to the tension member in the dislocated position, the tension member is then moved into the connected position where the second end of the tension member is connected to the frame member using mechanical leverage at the second end of the tension member such that the material is stretched to an appropriate condition on the frame member.

An additional embodiment of the present invention relates to a seat, such as a vehicle seat, having a seat portion and a back portion, the back portion having a frame member and a support member offset from the frame member, the back portion further includes a seat suspension device according to the present invention.

The tension member of the seat suspension device is preferably a rod connected to the frame member at a first end using an S-shaped connection to a hole in the tubular frame member or any other appropriate pivoting or moveable connection. The second end of the tension member pivots about the connection point and is connected to the frame member using a clasp or hook arrangement.

Accordingly, the suspension material has a first end having a first connector element such as a J-clip or other appropriate connectors for connections of the first end to the support member and a second end having a second connector element distal from the first connector for connection with the tension member. In a preferred embodiment of the present invention, the suspension material is folded back onto itself and is sewn at a sew line to create a folded section having the second end of the suspension material therein and the tension member or rod is inserted through the folded portion of the suspension material. Once the first connector element of the suspension material is connected to the support member and the second end of the suspension member is connected to the tension rod, the tension rod is moved to the closed position where the second end of the tension rod is connected to the clasp of the tubular frame member causing the suspension material to be stretched on the frame member of the seat.

A method for manufacturing a seat having a seat suspension device includes the steps of manufacturing a seat suspension material of an appropriate fabric and having a first end connector element for connection with the support member of the seat's suspension device and the second end having a second connector element distal from the first connector element for connection with a tension member of the seat suspension device. The material is anchored to the seat and is stretched into a contoured position. The first connector element is connected to the support member and the second connector element is connected to the tension member and the tension member is moved to be coupled with the frame member and to stretch the suspension material. The seat is further finished by applying additional trim and bolsters to complete the vehicle seat.

Accordingly, it is a feature of the present invention to provide a seat suspension device for suspending a material on a frame of a portion of a seat, such as a seat for use in a vehicle. It is a further feature of the present invention to provide a seat suspension device which is easier to use and install and is a more cost effective solution then has been available. Further, it is a feature of the present invention to provide a seat suspension device which is capable of providing a contoured seat suspension material. It is a further feature of the present invention to provide a seat suspension device which uses simple clips and loops to attach the seat suspension material to the frame and support member of the seat.

The present invention further relates to various features and combinations of features shown and described in the disclosed embodiments. Other ways in which the objects and features of the disclosed embodiments are accomplished will be described in the following specification or will become apparent to those skilled in the art after having read the following specification. Such other objects and features are deemed to fall to within the scope of the disclosed embodiment (s) if they fall within the scope of the claims which follow.

BRIEF DESCRIPTION OF THE DRAWINGS

FIG. 4 is a partial perspective view of a seat suspension device in an installed position according to the present invention.

FIG. 5 is a partial plan view of a tension member of the seat suspension device according to the present invention.

FIG. 6 is a cross section view taken along the line 6—6 of FIG. 4.

DETAILED DESCRIPTION OF THE PREFERRED EMBODIMENTS

Figure 1:
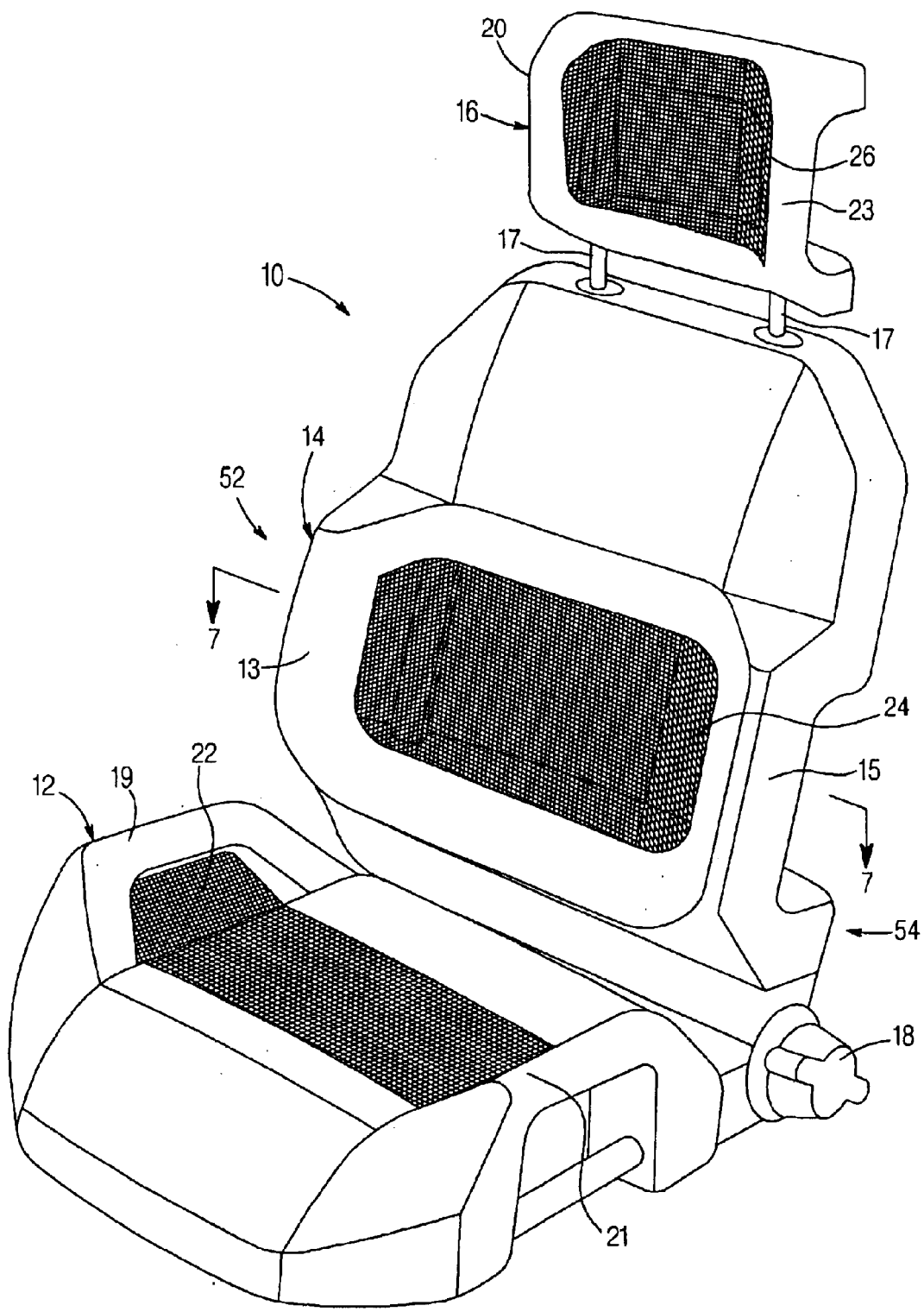
FIG. 1 is a perspective view of a seat for use in a vehicle including a seat suspension device according to the present invention.

Referring generally to FIGS. 1 through 7 and in particular to FIG. 1, there is shown a seat 10 for use in a vehicle (not pictured). The seat preferably includes a seat portion 12 and a back portion 14. The back portion 14 is preferably adjustable with respect to the seat portion 12 in that it can be reclined. A recliner control 18 is provided and preferably located at the junction between the seat portion 12 and the back portion 14, as is well known but may be connected using any known or appropriate means.

The seat 10 preferably but not necessarily includes a head rest 16 connected to the upper part of the back portion 14. The headrest 16 is mounted to the back portion 14 via a pair posts 17 as is well known but may be connected using any known or appropriate means. The seat 10 further includes a pair of bolsters for forming a contoured middle portion of the back portion 14. In particular, first side bolster 13 and second side bolster 15 are designed to provide lateral support to the thoracic back portion of an occupant of the seat 10. The seat portion 12 is provided with thigh bolsters 19 and 21 to provide lateral support to the seat and legs of an occupant of the seat 10. Similar to the back portion 14 and the seat portion 12 the head rest 16 includes side bolsters 20 and 23.

The seat 10 further includes suspended material portions in the seat portion 12, the back portion 14 and the headrest 16 for supporting the respective portions of the body of the occupant of the seat 10. A seat suspension material 22 is provided in a portion of the seat portion 12 to provide support and comfort to the occupant of the seat 10. A back suspension material is incorporated in the approximate midline portion of the back portion 14 of the seat 10 to provide comfort and support to the middle thoracic portion of the back of the occupant of the vehicle seat 10. A headrest suspension material 26 is located in the headrest 16 to provide support and comfort to the head of the occupant of the seat 10. It will be understood to a person of ordinary skill in the art that the seat suspension material 22, back suspension material 24 and head rest suspension material 26 are incorporated into the seat 10 using the same device and method as described below by way of example focusing on the back suspension material 24.

Figure 2:
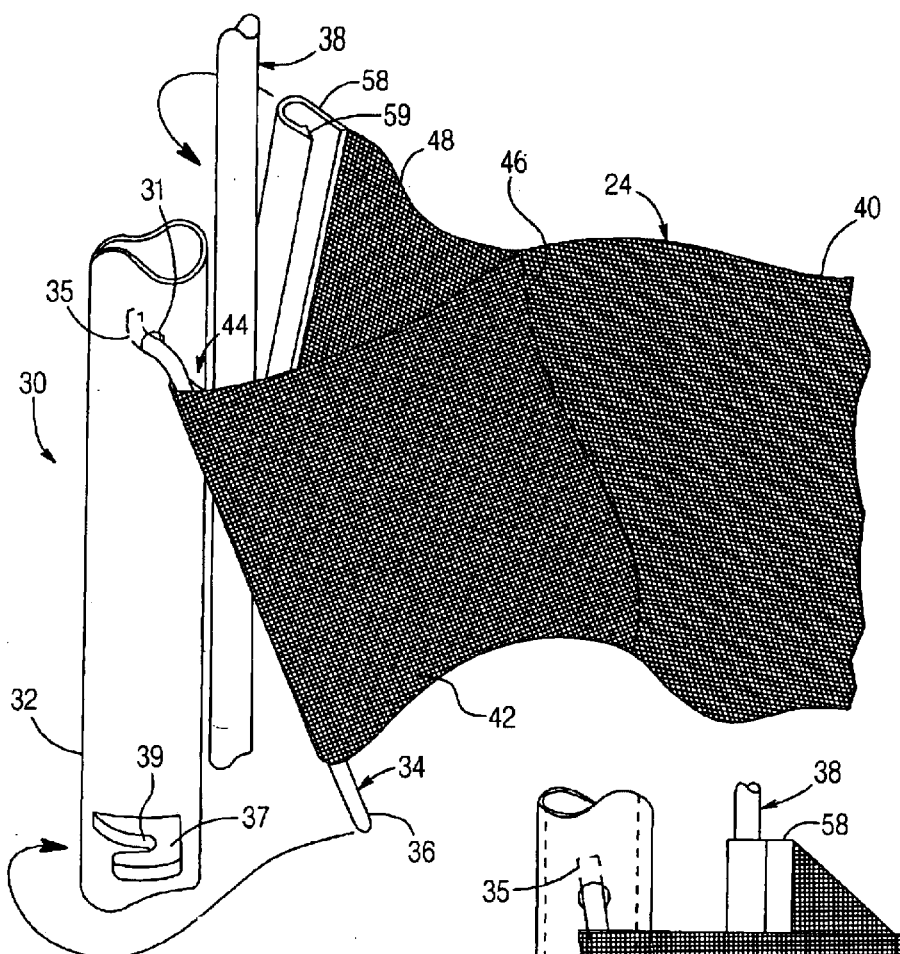
FIG. 2 is a partial perspective view of the seat suspension device according to the present invention in a partially installed condition.
Figure 3:
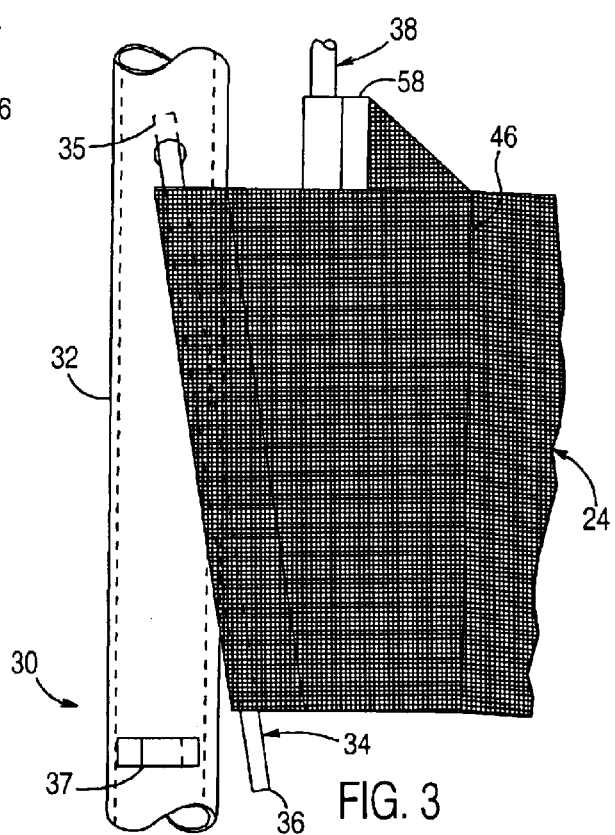
FIG. 3 is a plan view of the seat suspension device according to the present invention in a fully installed position.

Referring to FIG. 2 through FIG. 4, there is shown a material suspension device 30 according to the present invention. The material suspension device 30 preferably includes in one implementation (as shown in FIG. 2) a frame member 32 which is preferably a hollow tube made of a metal material having a predefined cross section. In particular, the frame member 32 of the preferred embodiment has a hollow circular cross-section but may have any other appropriate or known cross-section for providing structural rigidity to the frame of the respective portion of the seat 10, such as the seat portion 12, back portion 14 or head rest 16. The material suspension device 30, further preferably includes a support member 38 positioned offset from the frame member 32. The support member 38 also preferably has a predefined cross section as well as a predefined perimeter. In the disclosed embodiment, the support member 38 is preferably a rod-shaped member made of a metallic material, such as steel, having a circular perimeter but may be made of any appropriate material and of any appropriate construction for the purpose described herein. The support member 38 is positioned with respect to the frame member 32 as appropriate for the particular seat 10 in which the material suspension device 30 is being packaged.

A tension member 34, is connected to the frame member 32 by having a first end 35 of the tension member 34 inserted through a hole 31 in the frame member 32. The first end of the tension member 34 has an s-shaped configuration to allow the end 35 to be inserted in the hole 31 and to allow rotation or pivoting of the tension member 34 about the hole 31 while the end 35 of the tension member 34 is retained to the frame member 32. Any appropriate connection means can be used to attach the end 35 to the tension member 34 as long as it will serve the purpose discussed above. The tension member 34 has a second end 36 spaced distal from the first end 35 of the tension member 34. The second end 36 of the tension member 34 rotates about the hole 31 of the frame member 32 between a first position where the end 36 is dislocated from the frame member 32 and a second or tensioned position where the end 36 is connected to the frame member 32. The end 36 is connected to the frame member 32 via a boss, clasp or stand-off 37 extending from a periphery of the two member 32. The boss 37 includes a recess 39 for receiving the second end of the tension member 34. The recess 39 of the boss 37 has an opening preferably extending in a direction away from the first or dislocated position, such that the tension in the back suspension material 24 keeps the end 35 secure in the recess 39 when the end 35 is in the tension position.

The back suspension material 24 is made of any known or appropriate material but is preferably a material that may be used as an A-surface suspension/fabric for a vehicle or other seat. Further, the back suspension material 24 is preferably a polyester elastomer or polyester yarn woven fabric.

In the preferred embodiment of the present invention, the back suspension material is an elongated strip passing horizontally across the back portion 14 but maybe of any appropriate size and orientation. The back suspension material 24 includes a middle portion 40 preferably aligned with a middle of the seat 10 and a first end or portion 48 and a second end or portion 42. The first end includes a J-clip 58 attached thereto using any known or appropriate method. In the preferred embodiment of the present invention the J-clip 58 is sewn to the first end 48 in order to attach the J-clip 58 to the first end 48. However, any other appropriate means may be used to attach the J-clip 58 to the end 48, such as heat staking or integrally forming or molding the J-clip 58 to the first end 48. The J-clip 58 includes a barb 59 located on the shorter end of the J-clip 58. The J-clip 58 has an inner form perimeter that is preferably complimentary to the outer formed perimeter of the support member 38. The J-clip 58 attaches the first end 48 of the back suspension material 24 to the support member 38.

The second end 42 of the back suspension member 24 is preferably formed by folding the back suspension material 24 onto itself and sewing a line 46 in the back suspension material 24. The folding of the back suspension material 24 onto itself forms a pocket 44 (see FIG. 6) in the back suspension material 24 for receiving the tension member 34. It will be understood that it is possible to form the second end 42 using a separate piece of material attached to the middle portion 40 or as well as alternatively attaching a piece of material having a J-clip 58 attached to the second end 42. Accordingly, any appropriate construction of the back suspension material 24 in combination with the middle portion 4, the first end 48, the second end 42 that will properly anchor the ends of the back suspension material 24 is contemplated herein.

Figure 7:
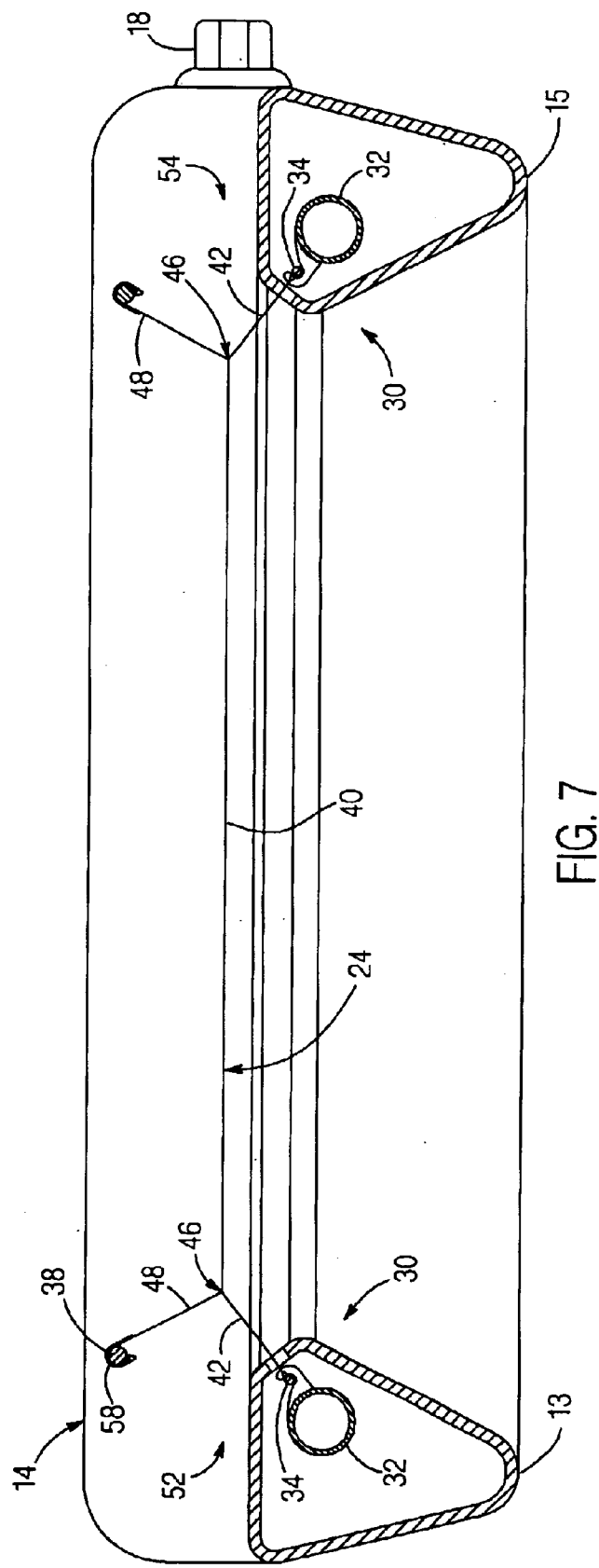
FIG. 7 is a cross section view taken along the line 7—7 in FIG. 1 showing the seat suspension device according to the present invention.

Accordingly, the first end 48 is preferably connected to the support member 38 and the second end 42 is slipped over the end 36 to connect the second end 42 to the tension member 34 by having the tension member 34 pass through the pocket 44 while the tension member 34 is dislocated from the recess 39 of the boss or clasp 37. Once the first end 48 is appropriately connected or otherwise attached to the support member 38 and the tension member 34 is located in the pocket 44 and the back suspension material 24 is properly adjusted, the tension member 34 is moved from the first or dislocated position to the second or tension position to have the end 36 located in the recess 39 of the clasp 37, resulting in the middle portion 40, first end 48 and second end 42 of the back suspension material 23 being tensioned and the back suspension material 24 being contoured by having the second end 42 and the middle portion 40 divided by the sew line 46 as best shown in FIG. 7.

Once the back suspension material 24 is configured with the frame member 32 and the support member 38 of a first material suspension device 30 on a first side 52 of the back portion 14 of the seat 10, a second material suspension device 30 on a second side 54 of the seat 10, similar to the first seat suspension device 30, can be installed. Preferably, the first and second back suspension devices 30 can be installed simultaneously during manufacture of the back portion 14 of the seat 10 as shown in FIG. 7. However, it is possible that either the first or second side of the suspension device 24, corresponding to the first and second sides 52 and 54 of the seat 10 may be installed before the other. Further, it is possible that only one material suspension device 30 is used on the back portion 14, for example on the first side 52 of the back portion 14 and that back suspension material is merely J-clipped or otherwise appropriately attached to the frame member of the second side 54 of the back portion 14 which results in a lower total cost while still providing the features and advantages of the present invention.

A method of manufacturing a seat having a seat suspension device 30 according to the present invention includes the steps of selecting or manufacturing the back suspension material 24 having the first end 48 having the connector or J-clip 58 and the second end 42 having the second connector, in the form of pocket 44, distal from the J-clip 58, for connection with the suspension member 34 of the seat suspension device 30. The J-clip 58 of the first end 48 of the back suspension material 24 is attached, connected or anchored to the support member 38 and the pocket 44 is attached, connected or otherwise anchored to the tension member 34 while it is in the first or dislocated position and the tension member is then moved to the second or tension position wherein the end 36 of the tension member 34 is located in the recess 39 of the clasp 37 and the back suspension material 24 is stretched into a contoured position.

In the step of selecting the back suspension material 24 it is possible to include the steps of selecting the suspension material to be a polyester material and separately the step of making the back suspension material 24 by selecting a length of material having a width and folding a portion of the material back onto itself and creating a sew line 46 in the back suspension material 24 and forming the pocket 44 and the second end 42. The step of selecting the back suspension material 24 may alternatively further include the step of attaching the connector 58 to the first end 48 using any known or appropriate means such as sewing, heat staking or unitarily forming the connector 58.

Preferably the seat 10 has first and second suspension devices 30 on first and second sides 52 and 54, respectively of the seat 10. It is possible to connect the first and second ends 48 and 42, respectively, of a given side of the back suspension material 24 simultaneously or sequentially in any order. Additionally, it is possible to only have one suspension device 30 on one side of the back suspension material 24 and for the other side to be anchored to the frame of the seat 10 without the aid of a suspension device 30. Thus, it is possible to connect each suspension device 30 corresponding to the first and second sides of the back suspension material 24 simultaneously or sequentially in any order. The seat 10 is further manufactured by selecting and applying, connecting or otherwise integrating the bolsters 13 and 15 as well as any other padding, switches, mechanisms, electronics and like as may be desired for the particular embodiment.

It is important to note that the construction and arrangement of the elements of the suspension device and anchoring system 30 as shown in the preferred and other exemplary embodiments are illustrative only. Although only a few embodiments of the present invention have been described in detail in this disclosure, those skilled in the art who review this disclosure will readily appreciate that many modifications are possible (e.g., variations in sizes, dimensions, structures, shapes and proportions of the various elements, values of parameters, mounting arrangements, materials, colors, orientations, etc.) without materially departing from the novel teachings and advantages of the subject matter recited in the claims. For example, the suspension anchoring concept disclosed herein may be used for any of a variety of seats with any of a variety of combinations, and orientations. Accordingly, all such modifications are intended to be included within the scope of the present invention as defined in the appended claims. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and/or omissions may be made in the design, operating conditions and arrangement of the preferred and other exemplary embodiments without departing from the spirit of the present invention as expressed in the appended claims.

What is claimed is:

1. A method of manufacturing a seat having a suspension material, comprising the steps of:
    selecting a seat portion;
    selecting a back portion;
    selecting a suspension material for assembly with one of the seat portion and the back portion, the suspension material having a first side having a first end for connection with a first side of the seat having a frame member and the first side of the suspension material having a second end for connection with a support member offset from the frame member, the second end of the suspension material being disposed distal from the first end of the suspension material;
    selecting a tension member having a first end and a second end; and
    attaching the first end of the tension member to the frame member such that the second end of the tension member can move between a first position in which the suspension material is not tensioned and a second position in which the suspension material is tensioned.

2. The method of manufacturing a seat having a suspension material according to claim 1, wherein the step of selecting a material includes the steps of folding the material to form the second end of the material; sewing the material to define a pocket in the second end of the material; and inserting the second end of the tension member in the pocket.

3. The method of manufacturing a seat having a suspension material according to claim 1, wherein the step of selecting a material includes the steps of folding the material to form the second end of the material; and sewing the material to define a pocket in the second end of the material and to fix the second end and the first end of the material; and
    wherein the method of manufacturing further comprises the steps of:
        attaching the first end of the material with the support member;
        inserting the tension member in the pocket in the second end of the material; and
        after the tension member is inserted in the pocket in the second end of the material, moving the second end of the tension member from the first position to the second position and connecting the second end of the tension member to the frame member such that the material is tensioned on the frame member.

4. A method of manufacturing a seat having a suspension material, comprising the steps of:
    selecting a seat portion;
    selecting a back portion;
    selecting a suspension material for assembly with one of the seat portion and the back portion, the suspension material having a first side having a first end for connection with a first side of the seat having a frame member and the first side of the suspension material having a second end for connection with a support member offset from the frame member, the second end of the suspension material being disposed distal from the first end of the suspension material; and
    selecting a tension adjustment member connected to one of the frame member and the support member,
    wherein the step of selecting a back portion includes the step of selecting a back portion having a first side and a second side, each of the first and second sides having a respective frame member and offset support member, the step of selecting a material including the step of selecting a material having a first side corresponding with the first side of the seat and a second side corresponding with the second side of the seat and each of the first and second sides of the material having a respective first end and second end, the step of selecting a tension member comprises the steps of:
        selecting a first tension member having a first end and a second end, the first end of the first tension member being connected to the first frame member of the first side of the back portion;
        connecting the first end of the second side of the material with the second frame member of the second side of the back portion;

connecting the second end of the second side of the material with the second support member of the second side of the back portion;

connecting the first end of the first side of the material with the first support member of the first side of the back portion;

connecting the second end of the first side of the material with the tension member connected to the first frame member of the first side of the back portion; and moving the second end of the first tension member from a first position to a second position wherein the second end of the first tension member is fixed and the material is in tension on the back portion.

5. The method of manufacturing a seat having a suspension material according to claim 4, the step of selecting a tension member further comprising the steps of:

selecting a second tension member having a first end and a second end, the first end of the second tension member being connected to the second frame member of the second side of the back portion; and moving the second end of the second tension member from a first position to a second position wherein the second end of the second tension member is fixed and the material is in tension on the back portion.

6. The method of manufacturing a seat having a suspension material according to claim 5, wherein the second end of the first tension member is moved into the second position sequentially with when the second end of the second tension member is moved into the second position.

7. The method of manufacturing a seat having a suspension material according to claim 5, wherein the second end of the first tension member is moved into the second position simultaneously with when the second end of the second tension member is moved into the second position.

8. A method of manufacturing a seat having a suspension material, comprising the steps of:

selecting a seat portion;

selecting a back portion;

selecting a suspension material for assembly with one of the seat portion and the back portion, the suspension material having a first side having a first end for connection with a first side of the seat having a frame member and the first side of the suspension material having a second end for connection with a support member offset from the frame member, the second end of the suspension material being disposed distal from the first end of the suspension material; and selecting a tension adjustment member connected to one of the frame member and the support member, wherein the step of selecting a seat portion includes the step of selecting a seat portion having a first side and a second side, each of the first and second sides having a respective frame member and offset support member, the step of selecting a material includes the steps of selecting a material having a first side corresponding with the first side of the seat and a second side corresponding with the second side of the seat and each of the first and second sides of the material having a respective first end and second end, the step of selecting a tension member comprises the steps of:

selecting a first tension member having a first end and a second end, the first end of the first tension member being connected to the first frame member of the first side of the seat portion;

connecting the first end of the second side of the material with the second frame member of the second side of the seat portion;

connecting the second end of the second side of the material with the second support member of the second side of the seat portion;

connecting the first end of the first side of the material with the first support member of the first side of the seat portion;

connecting the second end of the first side of the material with the tension member connected to the first frame member of the first side of the seat portion; and moving the second end of the tension member from a first position to a second position wherein the second end of the tension member is fixed and the material is in tension on the seat portion.

9. The method of manufacturing a seat having a suspension material according to claim 8, the step of selecting a tension member further comprises the steps of:

selecting a second tension member having a first end and a second end, the first end of the second tension member being connected to the second frame member of the second side of the seat portion; and moving the second end of the second tension member from a first position to a second position wherein the second end of the second tension member is fixed and the material is in tension on the seat portion.

10. The method of manufacturing a seat having a suspension material according to claim 9, wherein the second end of the first tension member is moved into the second position sequentially with when the second end of the second tension member is moved into the second position.

11. The method of manufacturing a seat having a suspension material according to claim 9, wherein the second end of the first tension member is moved into the second position simultaneously with when the second end of the second tension member is moved into the second position.

* * * * *